(12) United States Patent
Buliga et al.

(10) Patent No.: US 6,440,474 B1
(45) Date of Patent: Aug. 27, 2002

(54) TEXTURE AND STABILIZER COMPOSITION

(75) Inventors: Gregory S. Buliga, Langhorne; Domingo C. Tuason, Bensalem; Aaron C. Venables, Yardley, all of PA (US)

(73) Assignee: FMC Corporation, Philadelphia, PA (US)

( * ) Notice: Subject to any disclaimer, the term of this patent is extended or adjusted under 35 U.S.C. 154(b) by 0 days.

(21) Appl. No.: 09/574,604

(22) Filed: May 22, 2000

Related U.S. Application Data

(63) Continuation-in-part of application No. 08/792,314, filed on Jan. 31, 1997, now abandoned.

(51) Int. Cl.$^7$ .............................................. A23L 1/216
(52) U.S. Cl. ........................ 426/96; 426/578; 426/661; 426/654
(58) Field of Search ..................... 426/578, 96, 661, 426/654

(56) References Cited

U.S. PATENT DOCUMENTS

| | | | |
|---|---|---|---|
| 3,023,104 A | 2/1962 | Battista ............................ 99/1 |
| 3,297,806 A | 1/1967 | Battista ....................... 264/129 |
| 3,403,028 A | 9/1968 | Stancioff ........................ 99/26 |
| 3,539,365 A | 11/1970 | Durand et al. ............... 106/197 |
| 3,573,058 A | 3/1971 | Tiemstra ........................... 99/1 |
| 3,850,838 A | 11/1974 | Guckenberger et al. . 252/363.5 |
| 4,156,020 A | 5/1979 | Bohrmann et al. ............ 426/96 |
| 4,199,608 A | 4/1980 | Gilmore et al. .............. 426/570 |
| 4,216,242 A | 8/1980 | Braverman .................. 426/573 |
| 4,263,334 A | 4/1981 | McGinley .................... 426/573 |
| 4,311,717 A | 1/1982 | McGinley ................. 426/330.2 |
| 4,415,599 A | 11/1983 | Bos ............................. 426/578 |
| 4,557,938 A | 12/1985 | Sander et al. ................ 426/453 |
| 4,626,287 A | 12/1986 | Shah et al. ............... 106/197.1 |
| 4,704,294 A | 11/1987 | Rakosky ...................... 426/578 |
| 4,844,921 A | 7/1989 | Bakal et al. ................... 426/98 |
| 4,859,484 A | 8/1989 | Bielskis et al. .............. 426/573 |
| 4,980,193 A | 12/1990 | Tuason, Jr. et al. .......... 426/654 |
| 4,981,698 A | 1/1991 | Cherukuri et al. .............. 421/5 |
| 5,064,669 A | 11/1991 | Tan et al. ..................... 426/307 |
| 5,192,569 A | 3/1993 | McGinley et al. ............. 426/96 |
| 5,209,942 A | 5/1993 | Bauer et al. ................. 426/573 |
| H1229 H | 9/1993 | McGinley et al. ........... 426/654 |
| 5,286,510 A | 2/1994 | Bauer et al. ................. 426/573 |
| 5,338,562 A | 8/1994 | Humphreys .................. 426/603 |
| 5,342,636 A | 8/1994 | Bakshi et al. ................ 426/302 |
| 5,366,742 A | 11/1994 | Tuason, Jr. et al. ........... 426/96 |
| 5,429,830 A * | 7/1995 | Janovsky et al. .............. 426/94 |
| 5,441,753 A | 8/1995 | McGinley et al. ............. 426/96 |
| 5,462,761 A | 10/1995 | McGinley et al. ........... 426/573 |
| 5,505,982 A | 4/1996 | Krawczyk et al. ........... 426/660 |
| 5,527,540 A | 6/1996 | Gerely et al. ................ 424/466 |
| 5,605,712 A | 2/1997 | Bertrand et al. ............. 426/565 |
| 5,614,243 A | 3/1997 | Dunn et al. .................. 426/578 |
| 5,629,041 A | 5/1997 | Laaman et al. .............. 426/659 |
| 5,709,896 A * | 1/1998 | Hartigan et al. ............. 426/103 |
| 5,769,934 A | 6/1998 | Ha et al. ................. 106/162.86 |
| 5,789,004 A * | 8/1998 | Hogan et al. .................. 426/96 |
| 6,013,303 A * | 1/2000 | Reddy et al. ................ 426/603 |

FOREIGN PATENT DOCUMENTS

| | | |
|---|---|---|
| AU | 518 961 B | 10/1981 |
| GB | 2 296 725 A | 7/1996 |
| WO | WO 90/14017 | 11/1990 |
| WO | WO 92/01390 | 2/1992 |

OTHER PUBLICATIONS

Hawley's Condensed Chemical Dictionary p. 224.
Merck Index, $10^{th}$ ed. p. 254 Encyclopedia of Chemicals, Drugs & Biologicals.
Owen R. Fennema, 'Food Chemistry', $3^{rd}$. ed. p. 199.

* cited by examiner

*Primary Examiner*—Nina Bhat
(74) *Attorney, Agent, or Firm*—FMC Corporation

(57) ABSTRACT

A method coprocessing microcrystalline cellulose with maltodextrin to produce a dispersion that can be spray dried at high solids content to produce a flowing powder is disclosed. The coprocessed microcrystalline cellulose/maltodextrin composition can be blended with carboxymethyl cellulose to produce a dry blend that can be used in food and cosmetic applications.

7 Claims, No Drawings

TEXTURE AND STABILIZER COMPOSITION

CROSS-REFERENCE TO RELATED APPLICATIONS

This application is a continuation-in-part of Ser. No. 08/792,314, filed Jan. 31, 1997, abandoned incorporated herein by reference, which is a continued prosecution application of Ser. No. 08/792,314, filed Jan. 31, 1997, incorporated herein by reference.

FIELD OF THE INVENTION

This invention relates to the preparation and composition of a powder capable of functioning as a stabilizing agent in a wide variety of products such as foods and cosmetics. In particular, this invention relates to coprocessing microcrystalline cellulose with maltodextrin to produce a dispersion that can be spray dried at high solids content to produce a free flowing powder.

BACKGROUND OF THE INVENTION

Microcrystalline cellulose is an important component of many stabilizing agents and texture agents. However, when microcrystalline cellulose is prepared for use as a stabilizing agent and/or texture agent in a food or cosmetic, it must be coprocessed by drying with a material that acts a barrier dispersant. Unless a barrier dispersant is added, aggregation (hornification) occurs during dying, and the dried microcrystalline cellulose can not be readily redispersed. Dispersibility is essential for microcrystalline to function as a colloid in various applications, especially in the food area.

Durand, U.S. Pat. No. 3,539,365, discloses a process in which microcrystalline cellulose is coprocessed with carboxymethyl cellulose. This eliminates formation of undesirable aggregates on drying so that the dried product is easily redispersible in aqueous media. However, when carboxymethyl cellulose is coprocessed with microcrystalline cellulose by spray drying, concentrated solutions cannot be sprayed because of the high viscosity of concentrated carboxymethyl cellulose/microcrystalline cellulose solutions. Large volumes must be spray dried to obtain a given amount of a microcrystalline cellulose/carboxymethyl cellulose composition.

Therefore, a need exists for a method of producing microcrystalline cellulose that can be readily redispersed in aqueous media but does not require the processing of large volumes of liquid during spray drying.

SUMMARY OF THE INVENTION

This invention is a method of producing microcrystalline cellulose that can be readily redispersed in aqueous media but does not require the processing of large volumes of liquid during spray drying. The method comprises the steps of:

a) preparing an aqueous dispersion comprising maltodextrin and microcrystalline cellulose; and b) spray drying the aqueous dispersion to produce a coprocessed microcrystalline cellulose/maltodextrin composition;

in which:

the maltodextrin comprises about 40% to about 60% by weight of the total maltodextrin and microcrystalline cellulose in the dispersion and the microcrystalline cellulose comprises about 40% to about 60% by weight of the total maltodextrin and microcrystalline cellulose in the dispersion;

the dispersion comprises about 10% to about 30% total solids; and the coprocessed microcrystalline cellulose/maltodextrin composition is a free flowing powder.

In another embodiment, the invention is a dry blend comprising carboxymethyl cellulose and the coprocessed microcrystalline cellulose and maltodextrin composition.

This invention is particularly advantageous because the dispersion of microcrystalline cellulose and maltodextrin can be spray-dried at a solids content of up to about 30%. If carboxymethyl cellulose were used in place of maltodextrin, the through-put would be much lower because microcrystalline cellulose/carboxymethyl cellulose dispersions of this concentration cannot be spray dried. The invention reduces processing costs because the volume of mixture that must handled and the volume of water to be evaporated are greatly reduced.

When dispersed in a liquid, a coprocessed microcrystalline cellulose/maltodextrin composition will not substantially increase the viscosity of the liquid. However, when carboxymethyl cellulose is added, the viscosity of the liquid will increase and the composition will be stabilized.

DETAILED DESCRIPTION OF THE INVENTION

All percentages set forth in the specification and claims are percentages by weight unless otherwise indicated.

Coprocessed Microcrystalline Cellulose and Maltodextrin

A coprocessed microcrystalline cellulose/maltodextrin composition may be prepared by preparing an aqueous dispersion of microcrystalline cellulose and maltodextrin and spray drying the dispersion. Maltodextrin serves as a barrier dispersant to preserve the colloidal properties of the microcrystalline cellulose when the combination of materials is spray dried. It prevents hornification of the microcrystalline cellulose particles during spray drying and when being redispersed in a liquid.

The maltodextrin should have a dextrose equivalent (DE) of from about 4 to about 20. Generally, the higher the dextrose equivalent, the higher the solubility of the maltodextrin in water. However, if the dextrose equivalent exceeds 20, then the resultant coprocessed product might be too sticky to be of commercial use. If the dextrose equivalent is below about 4, the solubility of a liquid dispersion will be adversely affected so that the dispersion might be too viscous to process.

Microcrystalline cellulose may be obtained from a raw material such as wood, wood pulps such as bleached sulfate and sulfate pulps, cotton, flax, hemp, bast or leaf fibers, regenerated forms of cellulose, soy hulls, corn hulls, nut hulls, and the like. It is generally prepared from the raw material sources by a combination of a chemical degradation and mechanical attrition. Chemical degradation may be accomplished by any of several well-known methods. For example, the raw material may be rendered into a cellulose rich pulp, and the pulp hydrolyzed with dilute mineral acid. Partial removal of water by, for example, filtration produces a wet cake.

Wetcake is sheared to reduce the average particle size of from about 0.1 to about 10 microns. Shearing of the cellulose particles to form colloidal particles may be accomplished using any suitable apparatus such as a Silverson® mixer. The choice of mixer will be apparent to one skilled in the art taking into consideration the particle size desired. The amount of microcrystalline cellulose that may be present may vary widely but is preferably from about 62% to about 86%.

The aqueous dispersion containing maltodextrin and microcrystalline cellulose may be prepared by shearing microcrystalline cellulose wetcake in a mixer, such as a Silverson® mixer, adding the maltodextrin, and mixing to produce a uniform composition. If necessary, water is added to the dispersion to produce a dispersion with the desired solids content. The maltodextrin comprises about 40% to about 60% of the total microcrystalline cellulose and maltodextrin in the dispersion and the microcrystalline cellulose comprises about 40% to about 60% of the total microcrystalline cellulose and maltodextrin in the dispersion. When the coprocessed composition comprises less than 40% by weight maltodextrin, the it will not be satisfactory because the maltodextrin will not be present in an amount sufficient to operate as a barrier dispersant and prevent agglomeration of the microcrystalline cellulose particles. If more than about 60% of the maltodextrin is present in the coprocessed composition, the amount of microcrystalline cellulose present will be insufficient to obtain the proper colloidal content in a liquid.

In a preferred embodiment, microcrystalline cellulose and maltodextrin are each present in an amount of from about 45% to about 55%, based on the total amount of microcrystalline cellulose and maltodextrin present in the composition. In a more preferred embodiment, microcrystalline cellulose and maltodextrin are each present at about 50%.

The dispersion is then spray dried to form a free flowing powder. The dispersion is typically spray dried at an inlet temperature of from about 200° C. to about 280° C. and an outlet temperature of from about 100° C. to about 120° C. The dispersion typically comprises about 10% to 30% solids (i.e., maltodextrin and microcrystalline cellulose), preferably about 20% to about 30% total solids, and more preferably about 25% to about 30% total solids. Following spray drying, the microcrystalline cellulose/maltodextrin composition typically comprises about 3% to about 5% water.

Carboxymethyl Cellulose Addition

If the microcrystalline cellulose/maltodextrin composition is used by itself, there is no substantial increase in the viscosity of a liquid to which it is added. However, when it is desired to prepare a gravy or soup, for example, it usually is desired to increase the viscosity beyond that of a water-like consistency. The coprocessed microcrystalline cellulose/maltodextrin composition may have carboxymethyl cellulose added to it to increase the viscosity of the product.

Carboxymethyl cellulose is prepared in any suitable manner to yield a free flowing powder and added to the coprocessed microcrystalline cellulose/maltodextrin composition. A high viscosity carboxymethyl cellulose, such as AQUALONG® 7HF carboxymethyl cellulose or AQUALON® 7H carboxymethyl cellulose, is preferred.

Carboxymethyl cellulose can be added to the microcrystalline cellulose/maltodextrin composition as a free flowing powder and dry blended therewith. Addition of carboxymethyl cellulose to the coprocessed microcrystalline cellulose/maltodextrin composition provides stability to the microcrystalline cellulose dispersion and increases the viscosity of the liquid to which it is added.

When the resulting composition, which comprises carboxymethyl cellulose and coprocessed microcrystalline cellulose/maltodextrin, is dispersed in a liquid, the carboxymethyl cellulose and microcrystalline cellulose form a network that provides the viscosity and the rheology desired for the product to which it is added. However, the carboxymethyl cellulose will not form the network unless hornification of the microcrystalline cellulose has been prevented by coprocessing of the microcrystalline cellulose with maltodextrin.

Alternatively, the coprocessed microcrystalline cellulose/maltodextrin composition may be dispersed in a liquid and carboxymethyl cellulose dispersed in the same liquid.

Carboxymethyl cellulose may be added in an amount of from about 1% to about 20% of the total weight of the dry blend, typically about 2% to about 15%, preferably about 4% to about 10% of the total weight of the dry blend. The amount of carboxymethyl cellulose added depends on the end use for the composition and the viscosity desired for the final product.

The dry blend typically comprises about 1% to about 20% carboxymethyl cellulose and about 80% to 99% of the coprocessed microcrystalline cellulose/maltodextrin composition, based on the total amount of carboxymethyl cellulose and coprocessed microcrystalline cellulose/maltodextrin composition in the dry blend. Typically no other materials, other than small amounts (typically about 3% to about 5%) of water that were present in either the carboxymethyl cellulose and/or of the coprocessed microcrystalline cellulose/maltodextrin composition, are present in the dry blend.

The dry blend typically comprises about 1% to about 20% carboxymethyl cellulose, about 32% to about 60% microcrystalline cellulose, and about 32% to about 60% maltodextrin, based on the total amount of carboxymethyl cellulose, microcrystalline cellulose, and maltodextrin in the dry blend of carboxymethyl cellulose and coprocessed microcrystalline cellulose/maltodextrin composition. The dry blend preferably comprises about 2% to about 15% carboxymethyl cellulose, about 34% to about 59% microcrystalline cellulose, and about 34% to about 59% maltodextrin, based on the total amount of carboxymethyl cellulose, microcrystalline cellulose, and maltodextrin in the dry blend. More preferably, the dry blend comprises about 4% to about 10% carboxymethyl cellulose, about 36% to about 58% microcrystalline cellulose, and about 36% to about 58% maltodextrin, based on the total amount of carboxymethyl cellulose, microcrystalline cellulose, and maltodextrin in the dry blend. Even more preferably, the dry blend preferably comprises about 4% to about 10% carboxymethyl cellulose, about 40% to about 53% microcrystalline cellulose, and about 40% to about 53% maltodextrin, based on the total amount of carboxymethyl cellulose, microcrystalline cellulose, and maltodextrin in the dry blend.

INDUSTRIAL APPLICABILITY

The compositions may be added to a food or cosmetic product in an amount of from about 0.1% to about 20%. The amount of the composition added to the food or cosmetic product will depend on the food product to which it is added. Whether the microcrystalline cellulose/maltodextrin composition is used or whether the three component system, which also comprises carboxymethyl cellulose, is used will depend upon the product to which they will be added. For example, in the preparation of a dry powdered chocolate drink, the microcrystalline cellulose/maltodextrin composition and carboxymethyl cellulose would be added to stabilize the dry powdered drink so that the solids would not settle out when a liquid, such as milk, was added. In the preparation of salad dressing, the dry blend may be used to increase viscosity and to obtain proper mouthfeel and texture modification. The microcrystalline cellulose composition and the dry blend may be used in other products such as sour cream, yogurt, yogurt drinks, stabilized frozen yogurt, whipping creams, puddings, peanut butter and in low moisture food systems. They may also be used as an excipient for chewable tablets in pharmaceutical applications as well as for cosmetic applications, for example, in cold cream formulations and tooth paste.

The invention will now be illustrated with the following Examples, which illustrate but do not limit the invention.

EXAMPLES

| | Glossary |
|---|---|
| CMC | Carboxymethyl cellulose |
| DE | Dextrose equivalent |
| High viscosity CMC | AQUALON ® 7 HF Carboxymethyl cellulose (Aqualon Co., Wilmington, DE) |
| MCC | Microcrystalline cellulose |

Example 1

This example illustrates coprocessing of MCC wetcake with maltodextrin to produce a coprocessed microcrystalline cellulose/maltodextrin composition.

In a colloid mill was placed 7115.76 g of deionized water. To the water was added 1164 g of maltodextrin (10 DE, 93.9% solids). The colloid mill rheostat was set at 62.5 and an auxiliary Lightnin' mixer was operated at a rheostat setting of 75 for a period of 5 min. Upon completion of mixing, 3720.24 g of sheared, hydrolyzed cellulose wetcake was added to the colloid mill which was operated at the same settings for an additional 10 min. The resulting mixture contained 25% solids.

The viscosity of this mixture was measured by a Brookfield RVT viscometer fitted with Spindle #4 operated at 1 rpm for 3 min. The viscosity was 85,000 cps. The mixture was then passed through a homogenizer operated at 17,236.9 kPa (2500 psi). After homogenization, the viscosity was 96,600 cps. The homogenized mixture was then spray dried at an inlet temperature of 195° C. and an average outlet temperature of 115° C., yielding a free flowing powder as the product.

The same sheared, hydrolyzed cellulose wetcake was coprocessed with maltodextrin (DE 10) at the following ratios of MCC to maltodextrin: 80/20, 60/40, and 40/60. All the compositions were free flowing powders.

Example 2

This example illustrates coprocessing of hydrolyzed cellulose wetcake with maltodextrin to produce a coprocessed microcrystalline cellulose/maltodextrin composition.

The procedure of Example 1 was followed. Maltodextrin (655.82 g) (15 DE, 95.9% solids) and 1488.1 g of sheared, hydrolyzed cellulose wetcake were combined in 2856.08 g of deionized water. After homogenization the viscosity was 80,200 cps. Spray drying produced 514 g of coprocessed powder with a water content of 2.5% by weight. The coprocessed microcrystalline cellulose/maltodextrin composition was a free flowing powder.

The same sheared, hydrolyzed cellulose wetcake was coprocessed with maltodextrin (DE 15) at the following ratios of MCC to maltodextrin: 80/20, 60/40, and 40/60. The dispersion profiles of three of these coprocessed powders was determined by dispersing each at three concentrations, 8%, 10%, and 12%, in deionized water using a Waring blender for 3 min at 90 Volts. The viscosity of each was measured using a Brookfield RVT viscometer fitted with Spindle #3 operated at 20 rpm for 30 seconds. The results of these viscosity measurements are shown in

TABLE 1

| MCC/maltodextrin (DE 15) | Viscosity (cps) | | |
|---|---|---|---|
| Concentration | 8% | 10% | 12% |
| 50/50 | 368 | 550 | 1,050 |
| 60/40 | 210[a] | 300 | 650 |
| 80/20 | 75[a] | 125 | 250 |

[a]Two-phase separation of dispersion.

The phase separation observed for the dispersions of the 60/40 and 80/20 ratio materials at 8% solids demonstrates that there was insufficient material present to stabilize the dispersion.

Example 3

This example illustrates blending of the coprocessed microcrystalline cellulose/maltodextrin composition with high viscosity CMC to provide a dry blend comprising CMC and the coprocessed microcrystalline cellulose and maltodextrin composition synergistic effect on the viscosity of an aqueous dispersion was observed.

A dry blend of 94.42 parts of MCC/maltodextrin (DE 10) (50/50), prepared in Example 1, and 5.58 parts of high viscosity CMC was prepared by blending the materials in a Patterson-Kelley B Blender.

To prepare a dispersion in which there was 2.33% by weight of total solids, 7.56 g of the dry blend of CMC and the coprocessed microcrystalline cellulose and maltodextrin composition and an additional 1.76 g of maltodextrin (DE 10) were dispersed in 390.68 g of distilled water. A Waring blender was operated at a rheostat setting of 90 for 3 min followed by 10 min at a rheostat setting of 60. The initial viscosity of this dispersion was measured using a Brookfield RVT viscometer fitted with Spindle #4 operated at 1 rpm for 3 min. The initial viscosity of this dispersion was 1,000 cps. Twenty-four hours after making the dispersion, its set-up viscosity was measured in an identical manner. The set-up viscosity of this dispersion was 4,600 cps.

Other dispersions of this dry blend containing 4.66%, 6.99%, and 9.32% by weight solids were prepared in an identical manner. A proportionate amount of maltodextrin (DE 10) was added to the calculated amount of dry blend of coprocessed MCC/maltodextrin (DE 10) and carboxymethyl cellulose to provide the desired weight percent of solids in each dispersion. Similar dry blends of 80/20, 60/40, and 40/60 ratios of coprocessed MCC/maltodextrin (DE 10) and carboxymethyl cellulose were prepared. In preparing dispersions of these dry blends, appropriate amounts of additional maltodextrin were added to make a dispersion containing the desired weight percent of dry solids. The exception was the 40/60 coprocessed MCC/maltodextrin (DE 10) in which no additional maltodextrin (DE 10) was required. The initial viscosities of these dispersions are shown in Table 2, and the set-up viscosities for the same dispersions as measured after 24 hours are shown in Table 3.

TABLE 2

Initial Viscosities of MCC/maltodextrin (DE 10)
Coprocessed at Different Ratios

| | MCC/Maltodextrin | | Viscosity (cps) | | | |
|---|---|---|---|---|---|---|
| Solids (%) | MCC (%) | CMC (%) | 80/20 | 60/40 | 50/50 | 40/60 |
| 2.33 | 0.88 | 0.13 | 0 | 500 | 1,000 | 1,000 |
| 4.66 | 1.76 | 0.26 | 1,000 | 23,600 | 28,000 | 32,800 |
| 6.99 | 2.64 | 0.39 | 4,000 | 63,400 | 64,800 | 67,000 |
| 9.32 | 3.52 | 0.52 | 8,000 | 102,000 | 105,200 | 106,000 |

TABLE 3

Set-up Viscosities of MCC/maltodextrin (DE 10)
Coprocessed at Different Ratios

| | MCC/Maltodextrin | | Viscosity (cps) | | | |
|---|---|---|---|---|---|---|
| Solids (%) | MCC (%) | CMC (%) | 80/20 | 60/40 | 50/50 | 40/60 |
| 2.33 | 0.88 | 0.13 | 500 | 3,500 | 4,600 | 5,400 |
| 4.66 | 1.76 | 0.26 | 3,000 | 37,000 | 41,400 | 43,200 |
| 6.99 | 2.64 | 0.39 | 9,000 | 92,800 | 97,600 | 98,600 |
| 9.32 | 3.52 | 0.52 | 38,000 | 140,000 | 144,200 | 142,000 |

Example 4

This example illustrates the coprocessed microcrystalline cellulose/maltodextrin composition dry blended with high molecular weight carboxymethyl cellulose and characterized at equivalent levels of microcrystalline cellulose and carboxymethyl cellulose.

A dry blend of CMC and the coprocessed microcrystalline cellulose/maltodextrin composition (DE 15) (50/50) prepared in Example 2 was prepared using 94.42 parts of the coprocessed powder and 5.58 parts of CMC. Following the procedure of Example 3, dispersions containing 2.33%, 4.66%, 6.99%, and 9.32% by weight solids were prepared, and their viscosities measured. Dispersions of the dry blend in ratios of 80/20, 60/40, and 40/60 and carboxymethyl cellulose were prepared and the initial and set-up viscosities measured. The initial viscosities of these dispersions are shown in Table 4, and their set-up viscosities are shown in

TABLE 4

Initial Viscosities of MCC/maltodextrin (DE 15)
Coprocessed at Different Ratios

| | MCC/Maltodextrin | | Viscosity (cps) | | | |
|---|---|---|---|---|---|---|
| Solids (5) | MCC (%) | CMC (%) | 80/20 | 60/40 | 50/50 | 40/60 |
| 2.33 | 0.88 | 0.13 | 0 | 500 | 1,000 | 1,000 |
| 4.66 | 1.76 | 0.26 | 1,500 | 24,000 | 35,000 | 34,000 |
| 6.99 | 2.64 | 0.39 | 6,000 | 66,800 | 68,200 | 69,400 |
| 9.32 | 3.52 | 0.52 | 10,000 | 104,000 | 111,200 | 118,000 |

TABLE 5

Set-up Viscosities of MCC/maltodextrin (DE 15)
Coprocessed at Different Ratios

| | MCC/Maltodextrin | | Viscosity (cps) | | | |
|---|---|---|---|---|---|---|
| Solids (5) | MCC (%) | CMC (%) | 80/20 | 60/40 | 50/50 | 40/60 |
| 2.33 | 0.88 | 0.13 | 500 | 4,200 | 5,200 | 5,400 |
| 4.66 | 1.76 | 0.26 | 3,500 | 38,400 | 43,800 | 44,000 |
| 6.99 | 2.64 | 0.39 | 10,000 | 92,000 | 98,000 | 99,400 |
| 9.32 | 3.52 | 0.52 | 38,400 | 141,000 | 145,400 | 146,000 |

Based on the viscosity profiles, the higher the level of maltodextrin in the coprocessed composition the higher the viscosity. There is a large difference in viscosity when comparing the 20 and 40% maltodextrin level. This indicates that the 20% level is not enough to make the product colloidal and cause an interaction with the high viscosity carboxymethyl cellulose. For the interaction (colloidal gel network) to occur, both colloidal microcrystalline cellulose (obtained with >40% maltodextrin level) and high viscosity carboxymethyl cellulose are needed. In absence of either component, the desired interaction will not be produced.

Example 5

This example illustrates preparation of a frozen dessert using carboxymethyl cellulose and the coprocessed microcrystalline cellulose/maltodextrin composition.

In a container stirred with a Lightnin' mixer, 2347 g of skim milk and 666.8 g of light cream were mixed for about 5 min before adding a dry blend of 266.8 g of non fat milk solids, 480 g of sugar, 208.8 g of 42 DE corn syrup solids, 16 g of MCC/maltodextrin (50/50, 41% colloidal content) as prepared in Example 1, 0.4 g of carrageenan (VISCARIN® PS 171 Carrageenan, FMC Corporation, Philadelphia, Pa.), and 4 g of high viscosity CMC. This dry blend was added to the vortex of the mixer and mixed for 30 min to fully hydrate the gums. After increasing the temperature to 57° C. (135° F.), 10 g of emulsifier (an 80:20 mixture of mono, diglycerides; Polysorbate 80) was added to the mixture which was stirred for an additional 2–3 min. Upon completion of mixing, the mixture was pasteurized by a high temperature short time process utilizing a Cherry-Burrel Ultra High Temperature unit operated for 25 seconds at 80° C. (176° F.). After pasteurization, the mixture was homogenized using an APV Gaulin Homogenizer, the first stage being operated at 2000 psi and the second stage at 500 psi. Upon completion of homogenization, the mixture was cooled and aged overnight in a refrigerator at 4° C. (39.2° F.). At the conclusion of the aging period, the mixture was frozen using a Taylor scraped surface ice cream freezer, packed in 236.6 mL (8 oz.) paper containers, and placed in a −28.9° C. (−20° F.) freezer to harden for at least 24 hours. Prior to being frozen the viscosity of the mixture was measured using a Brookfield LVF viscometer fitted with Spindle #2 operated at 60 rpm. The viscosity of this mixture was 175 cps. Evaluation by a sensory panel judges this frozen dessert to be 3.4 on a scale of 1–5 where 1 was icy and 5 was a warm sensation, which was preferred. The panel also evaluates the body of the frozen dessert, giving it a rating of 3.8 on a scale of 1–5 where 1 was a lack of control of body and 5 was a heavy body (preferred). To measure the rate of melting of the frozen dessert, 236.6 mL (8 oz.) of it was placed on a 16 mesh wire gauze placed over a 100 mL graduated cylinder. As the dessert melts, it drips into the graduated cylinder and the total molten material was measured after one hour. During this period, 55 mL of the dessert melted.

For purposes of comparison, the same formulation and procedure were used to prepare a frozen dessert stabilized with AVICEL1® RC-581 microcrystalline cellulose (FMC Corporation), 63% percent colloidal content. The viscosity of the mixture prior to being frozen was 180 cps. The sensory panel placed both the iciness/warmth and the body of the frozen dessert at 3.0. During 60 min, 73 mL of this frozen dessert melted.

Having described the invention, we now claim the following and its equivalents.

What is claimed is:

1. A coprocessed microcrystalline cellulose/maltodextrin composition, the composition produced by the steps of:
    a) preparing an aqueous dispersion consisting essentially of maltodextrin and microcrystalline cellulose; and
    b) spray drying the aqueous dispersion to produce a coprocessed microcrystalline cellulose/maltodextrin composition;

in which:
   the maltodextrin comprises about 40% to about 60% by weight of the total maltodextrin and microcrystalline cellulose in the dispersion and the microcrystalline cellulose comprises about 40% to about 60% by weight of the total maltodextrin and microcrystalline cellulose in the dispersion;
   the maltodextrin has a dextrose equivalent of about 4 to about 20;
   the dispersion comprises about 25% to about 30% total solids;
   the coprocessed microcrystalline cellulose/maltodextrin composition is a free flowing powder; and
   the dispersion is spray dried at an inlet temperature of from about 200° C. to about 280° C. and an outlet temperature of from about 100° C. to about 120° C.

2. The coprocessed microcrystalline cellulose/maltodextrin of claim 1 in which the maltodextrin comprises about 45% to about 55% by weight of the total maltodextrin and microcrystalline cellulose in the dispersion and the microcrystalline cellulose comprises about 45% to about 55% by weight of the total maltodextrin and microcrystalline cellulose in the dispersion.

3. A dry blend comprising:
   about 1% by weight to about 20% by weight of high viscosity carboxymethyl cellulose, and
   about 80% by weight to about 99% by weight of a coprocessed microcrystalline cellulose/maltodextrin composition;
   the dry blend prepared by the steps of:
   a) preparing an aqueous dispersion consisting essentially of maltodextrin and microcrystalline cellulose;
   b) spray drying the aqueous dispersion to produce a coprocessed microcrystalline cellulose/maltodextrin composition; and
   c) dry blending about 1% by weight to about 20% by weight of high viscosity carboxymethyl cellulose with the coprocessed microcrystalline cellulose/maltodextrin composition;

in which:
   the maltodextrin has a dextrose equivalent of about 4 to about 20;
   the maltodextrin comprises about 40% to about 60% by weight of the total maltodextrin and microcrystalline cellulose in the dispersion and the microcrystalline cellulose comprises about 40% to about 60% by weight of the total maltodextrin and microcrystalline cellulose in the dispersion;
   the dispersion comprises about 25% to about 30% total solids; and
   the coprocessed microcrystalline cellulose/maltodextrin composition is a free flowing powder.

4. The dry blend of claim 3 in which the dispersion is spray dried at an inlet temperature of from about 200° C. to about 280° C. and an outlet temperature of from about 100° C. to about 120° C.

5. The dry blend of claim 3 comprising about 4% to about 10% carboxymethyl cellulose, about 36% to about 58% microcrystalline cellulose, and about 36% to about 58% maltodextrin, based on the total amount of carboxymethyl cellulose, microcrystalline cellulose, and maltodextrin in the dry blend.

6. A dry blend comprising:
   about 1% by weight to about 20% by weight of high viscosity carboxymethyl cellulose, and
   about 80% by weight to about 99% by weight of a coprocessed microcrystalline cellulose/maltodextrin composition;

in which:
   the maltodextrin has a dextrose equivalent of about 4 to about 20;
   maltodextrin comprises about 40% to about 60% by weight of the total maltodextrin and microcrystalline cellulose in the coprocessed microcrystalline cellulose/maltodextrin composition and the microcrystalline cellulose comprises about 40% to about 60% by weight of the total maltodextrin and microcrystalline cellulose in the coprocessed microcrystalline cellulose/maltodextrin composition; and
   the dry blend is a free flowing powder.

7. The dry blend of claim 6 comprising about 4% to about 10% carboxymethyl cellulose, about 36% to about 58% microcrystalline cellulose, and about 36% to about 58% maltodextrin, based on the total amount of carboxymethyl cellulose, microcrystalline cellulose, and maltodextrin in the dry blend.

* * * * *